Figure 1:
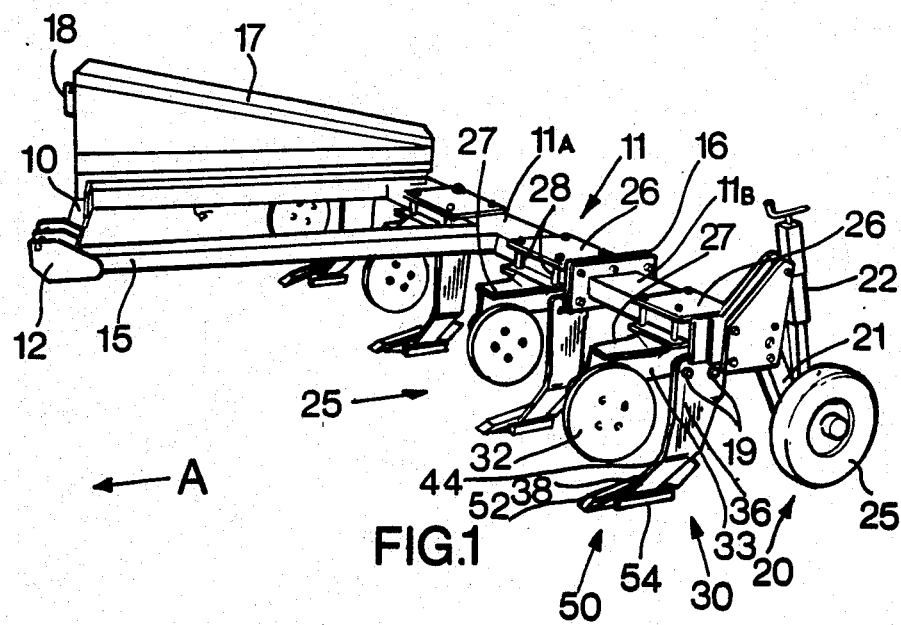

United States Patent [19]

Linger

[11] Patent Number: 4,548,276

[45] Date of Patent: Oct. 22, 1985

[54] SOIL CULTIVATING IMPLEMENT

[75] Inventor: Barry A. Linger, Harleston, England

[73] Assignee: Howard Machinery Public Limited Company, Harleston, England

[21] Appl. No.: 518,971

[22] Filed: Aug. 1, 1983

[30] Foreign Application Priority Data

Nov. 8, 1982 [GB] United Kingdom ............... 8223106

[51] Int. Cl.⁴ .......................................... A01B 13/08
[52] U.S. Cl. ................... 172/166; 172/196; 172/699; 172/772.5; 172/774
[58] Field of Search ............... 172/699, 700, 698, 766, 172/768, 770, 196, 166, 772.5, 774

[56] References Cited

U.S. PATENT DOCUMENTS

| | | | |
|---|---|---|---|
| 504,444 | 9/1893 | Corser | 172/768 X |
| 601,904 | 4/1898 | Pike | 172/774 X |
| 1,840,126 | 1/1932 | Palmer | 172/698 |
| 2,212,136 | 8/1940 | Vale | 172/698 X |
| 2,952,322 | 9/1960 | Jurcheck | 172/196 X |
| 4,409,912 | 10/1983 | Koronka | 172/699 |

FOREIGN PATENT DOCUMENTS

| | | | |
|---|---|---|---|
| 32945 | 3/1924 | Denmark | 172/699 |
| 360075 | 6/1938 | Italy | 172/698 |
| 1493346 | 11/1977 | United Kingdom | 172/699 |
| 1574412 | 9/1980 | United Kingdom | 172/699 |
| 2063632 | 6/1981 | United Kingdom | 172/699 |
| 974957 | 11/1982 | U.S.S.R. | 111/7 |

*Primary Examiner*—Richard J. Johnson
*Attorney, Agent, or Firm*—Wood, Dalton, Phillips, Mason & Rowe

[57] ABSTRACT

A cultivating implement is intended to loosen the soil without significant distrubance of the soil surface. The implement has a frame and at least one soil working tool mounted on the frame.

The tool includes a blade with a lower inclined portion and an upper upright portion which portions are interconnected by an intermediate portion.

The inclined portion is moved edgewise through the ground and lies at an acute angle to the vertical to lift soil lying above the inclined portion. The intermediate portion is located in use at or below ground level.

The intermediate portion may comprise a bend or the blade may be curved over the intermediate and inclined portions.

The blade may be preceded by a disc arranged to cut a slot in the ground to be entered by the blade. The disc is rotatable about a horizontal axis.

10 Claims, 12 Drawing Figures

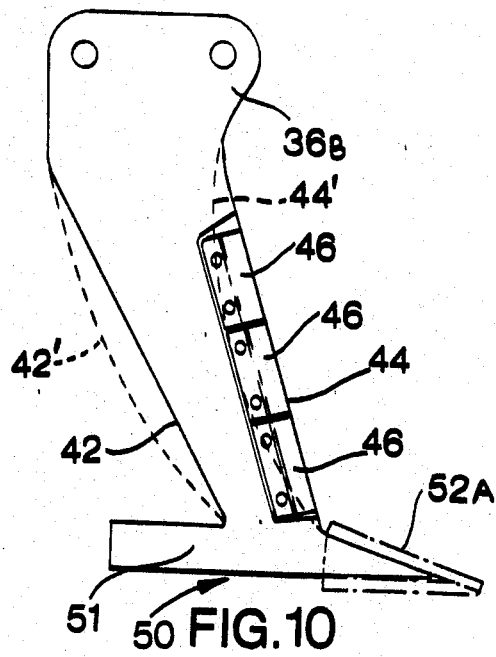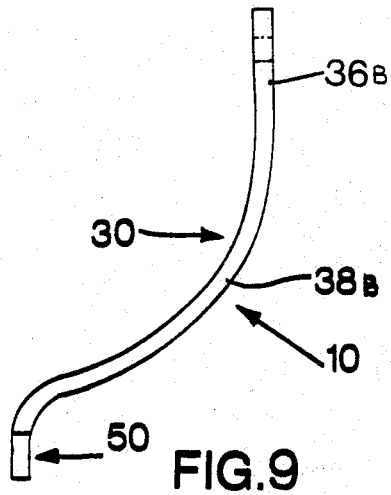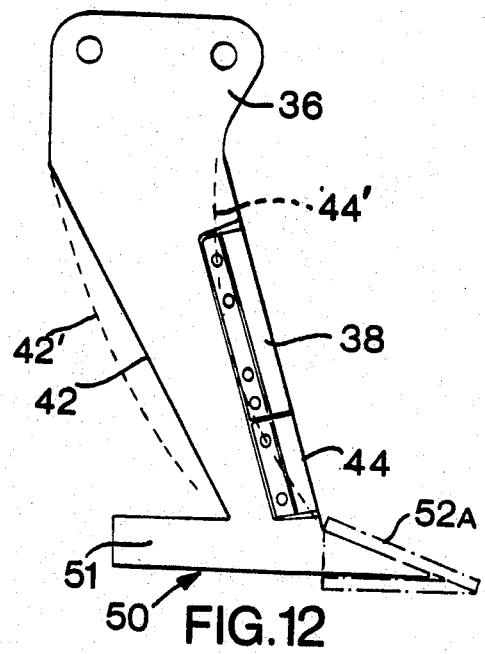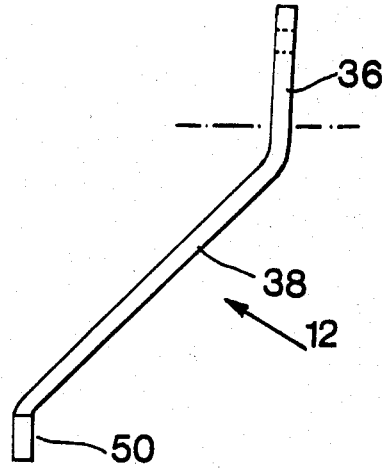

SOIL CULTIVATING IMPLEMENT

This invention relates to soil cultivating implements and in particular to cultivating implements for loosening the soil.

It has been proposed, for example in British Patent Specification Nos. 1,493,346 and 1,574,412, to provide a soil loosening implement having a blade which in use extends downwards into the ground at an acute angle to the vertical and which is supported at its upper end to be drawn edgewise through the ground. The inclined orientation of the blade ensures that the soil above the blade is lifted and loosened without significant disturbance of the soil surface by passage of the blade.

The inclined blade is usually associated with an upright blade portion by which the blade is attached to a frame supporting the blade for passage over the ground. Such a blade is located at a height relative to the ground surface by which the upright portion is clear of the ground surface and the ground surface level is towards the upper end of the inclined blade portion.

In order to open up a slot in advance of the blade during a cultivating action it has been proposed to provide a disc which penetrates the ground ahead of the blade to provide a shallow slot into which the blade moves as it is advanced over the ground. Due to the inclination of the blade in the ground it is necessary to incline the disc at substantially the same angle as the blade so that the slot formed is aligned with the inclined blade. However in conditions in which there is significant surface debris or trash on the ground, the inclined disc may have difficulty in penetrating the trash to form the slot and a suitable slot may not be formed and/or the slot may have the trash pressed into it without being cut through. In either case the inclined blade may become entwined in the trash and a build-up of trash on the blade can occur which interferes with the effective operation of the cultivating implement.

An object of the invention is to provide an improved cultivating implement able to effect sub-surface loosening of the soil.

According to the invention a cultivating implement comprises a frame, and at least one soil working tool mounted on the frame, the tool including a blade having an inclined portion which in operation extends downwardly into the soil in a plane substantially parallel to its direction of travel through the soil, said portion passing edgewise through the soil in operation and being inclined at an acute angle to the vertical so as to lift the soil lying above the inclind blade portion, the blade also having an upper portion, the inclined portion extending at a greater angle to the vertical than said upper portion, and an intermediate region of the blade between said upper portion and said inclined portion being located in use at or below the level of the ground surface.

Conveniently said upper portion of the blade is substantially upright and the inclined portion of the blade lies at an angle of between 30°-60° to the vertical.

Preferably the implement also has a rotatable disc mounted on the frame and arranged for forming a slot in the soil in advance of the soil working tool, the disc being mounted in a substantially upright position for rotation about a substantially horizontal axis so that the upper portion of the blade enters the slot formed by the disc.

In one arrangement the inclined portion and the upper portion of the blade are rectilinear as viewed in end elevation in the direction of travel, and the inclined and upper portions are at an obtuse angle relative to one another.

Alternatively the inclined portion of the blade is curvilinear in end elevation having a varying inclination relative to the vertical and said inclination being less towards the upper end of the inclined portion. Conveniently, when the blade is curvilinear, the curve is formed as the arc of a circle at least over the lower inclined portion. In this case the inclined blade portion will be at different inclinations to the vertical along its length and it is preferred that towards its lowermost end the blade is at relatively high angles to the vertical, the angle decreasing on approaching the soil surface level until in this region the blade approaches said upright position.

The use of an arcuate blade enables two or more replaceable leading wearing edges to be employed on the blade which are each of the same curvature and the positions of which can therefore be interchangeable. Moreover the use of a curvilinear or arcuate inclined blade portion enables the blade to effect a soil loosening action across a greater width without any increase in the depth of operation, compared with a rectilinear inclined blade portion.

By the use of a disc in advance of the blade which rotates in a substantially vertical plane in advance of the blade the disc is capable of more effectively entering the soil surface and cutting through any surface trash than an inclined disc, as used hitherto.

In each case the blade portions may be contiguous with one another and preferably formed from a single piece of metal and, at the lower end of the blade, is located a foot member by which the blade is drawn down into the soil. Side surfaces of the foot member also serve to resist lateral forces on the tool due to the action of the inclined portion on the soil. The foot member may be secured to the lower end of the blade or may be formed integrally with the blade.

Preferably the inclined portion of the blade is at an angle of inclination of between 30° and 60° to the vertical and in the case of a curvilinear inclined portion the angle varies along its length but is generally within the indicated range except at its lower end which may approach a horizontal position. Conveniently the upper portion of the blade is so dimensioned and mounted on the frame that, in use, the vertical distance between the frame and the soil level approximates to the depth below the soil level of the lower end of the tool to provide adequate clearance for the frame to pass over plant debris on said soil surface.

Figure 2:
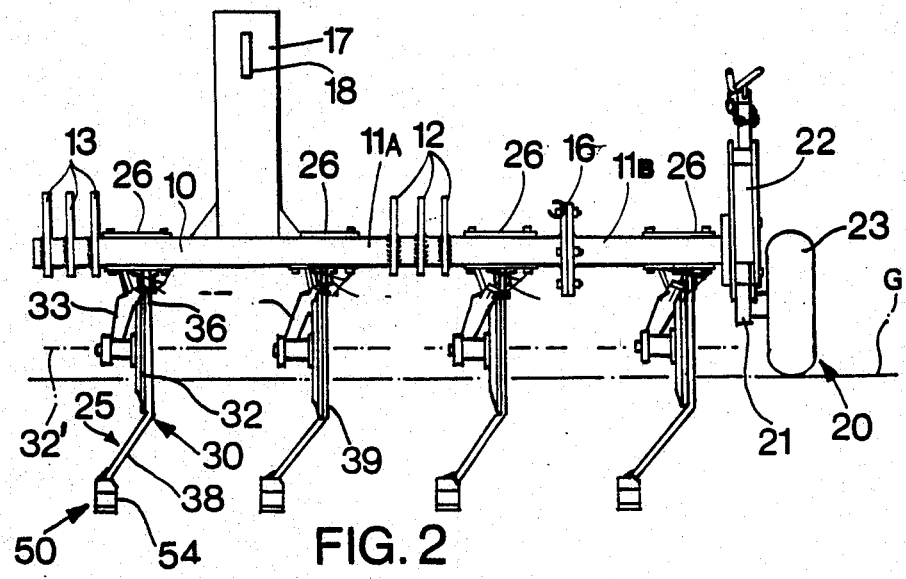
Figure 3:
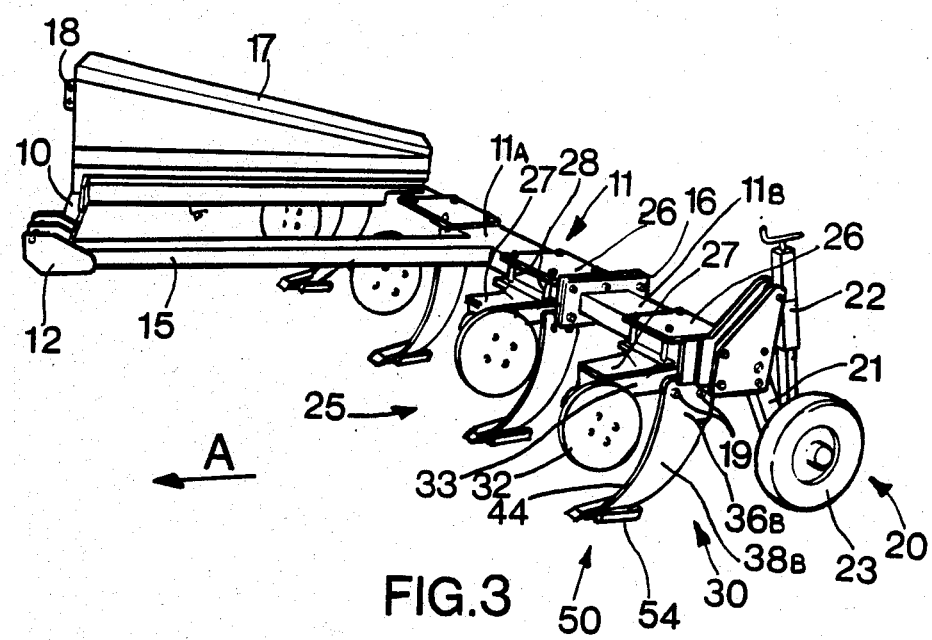
Figure 4:
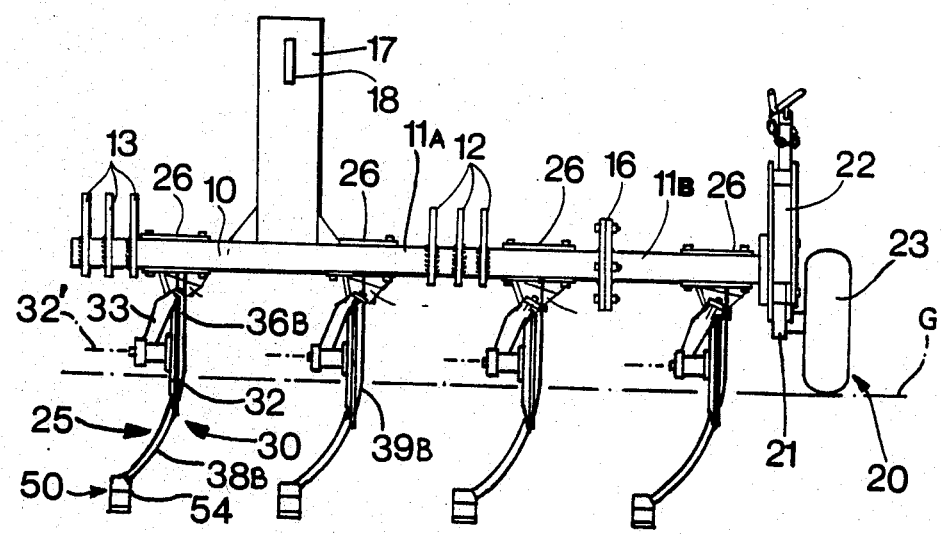
Figure 5:
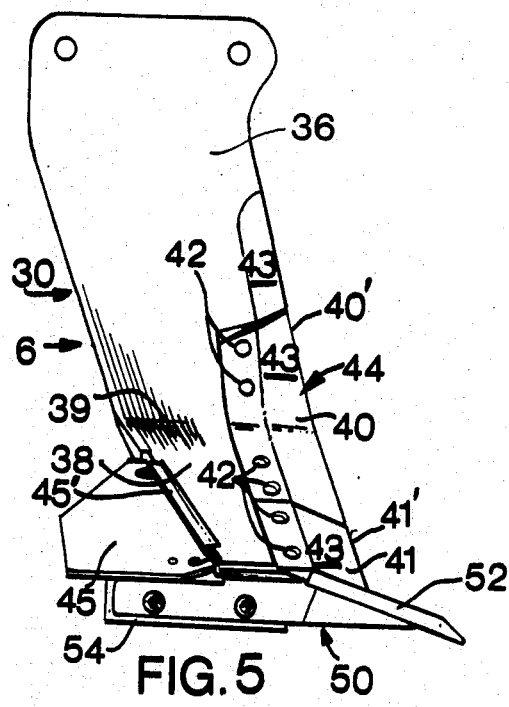
Figure 6:
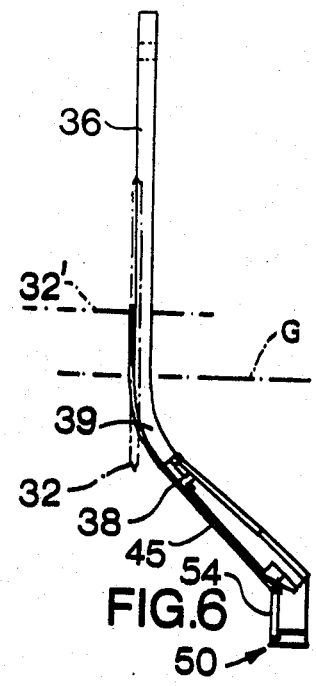
Figure 8:
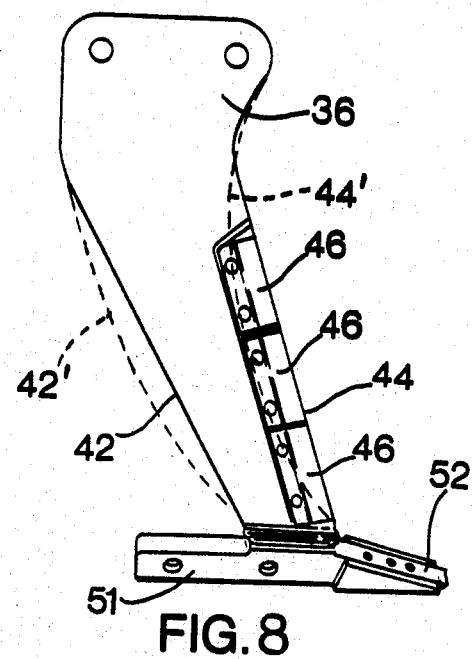
Figure 7:
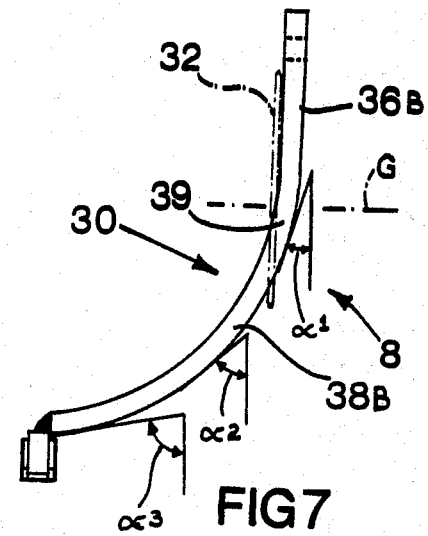

Further features of the invention will appear from the following description of embodiments of the invention given by way of example only and with reference to the drawings, in which:

FIG. 1 is a perspective view of a soil loosening implement with one form of leg or tool, FIG. 2 is a front elevation of the implement of FIG. 1, FIG. 3 is a perspective view corresponding to FIG. 1 of an implement with another form of leg or tool, FIG. 4 is a front elevation of the implement of FIG. 3, FIG. 5 is a front elevation to a larger scale of the tool of the implement of FIGS. 1 and 2, FIG. 6 is a view in the direction of arrow 6 of the tool of FIG. 5, FIG. 7 is an end elevation of a tool of the implement of FIGS. 3 and 4 to a larger scale, FIG. 8 is a view in the direction of arrow 8 in FIG. 7, FIG. 9 is an end elevation of another form of tool, FIG. 10 is a view in the direction of arrow 10 of the tool of FIG. 9, FIG. 11 is an end elevation of another form of tool, and FIG. 12 is a view in the direction of arrow 12 in FIG. 11.

Referring to the drawings and firstly to FIGS. 1 and 2 and FIGS. 3 and 4 a cultivating implement includes a frame arranged to be mounted on the three point linkage of a tractor. The frame has a forward transverse beam 10 and a rearward transverse beam or tool bar 11. On the forward beam 10 are located transversely spaced brackets 12 and 13 for connection to the lower arms of a three point linkage (not shown) of a tractor, in known manner. The beam 10 is perpendicular to the direction of travel A of the implement and the rear bar 11 is inclined at an acute angle to the direction of travel A.

The beam 10 and bar 11 are interconnected by longitudinal beams 15, one beam (not seen) connecting one end of the beam 10 to one end of the bar 11 and the beam 15 connecting the other end of the beam 10 to the bar 12. As shown the bar 11 is formed of two interconnected portions 11A and 11B having a flanged connection 16.

The beam 10 and the bar 11 are also connected by a support member or headstock 17, of generally truncated triangular form, which carries at its forward, upper end a bracket 18 for attaching the upper link of the three point linkage.

The rearward end of the bar 11 carries a ground wheel assembly 20 including an arm 21 and a height adjustment device 22, a ground engaging wheel 23 being mounted at the end of the arm to support the frame, when the implement is in use, at an adjustable height relative to the ground surface G. Mounted on the bar 11 at positions equally spaced along the bar are, in this case, four cultivating tool assemblies 25. Each of the four assemblies of FIGS. 1 and 2 are the same but the tool assemblies of FIGS. 3 and 4 are different from those of FIGS. 1 and 2. Due to the inclination of the bar 11 to the direction of travel A the assemblies of each implement are in echelon, that is, each assembly 25 is to the rear and to one side of the preceding assembly.

Each tool assembly is mounted on the bar 11 by a fixing plate 26 located over the bar 11, the plate being secured by bolts 28 to a body 27 located under the bar 11 and the body extending parallel to the direction of travel A. Each body 27 has secured to it a cultivating tool 30 and towards the forward end of the body is a rotatable disc 32 for opening up a slot in advance of the tool 30. The disc 32 is carried on an arm 33 which is spring-loaded downwardly to resiliently urge the disc towards the ground in the operative position of the implement.

As thus far described the implement is of known construction to provide a frame for mounting the tools 30 and discs 32. The tools 30, sometimes termed 'legs', and the discs 32 can take various forms, two of which are now described, firstly with reference to FIGS. 1, 2, 5 and 6. In this case the tools take a similar form to those described in our prior British application No. 8215106, that is each tool has an upright portion 36 apertured to receive bolts 37 for attaching the tool to the body 27. The portion 36 is vertical in use and is integral with an inclined portion 38 preferably lying at between 30° to 60° to the vertical, conveniently, as shown, at 45° to the vertical. The upright portion 36 is contiguous with the inclined portion 38 through an intermediate bent region 39.

As will be seen, particularly in FIGS. 2 and 6, the tool is operated with the ground surface G at a level such that the lower end of the vertical portion 36 penetrates the ground surface and the region 39 between the vertical and inclined portions is below ground level. In this way the entire inclined portion 38 constitutes a ground working portion as does the region 39 and the lower end of the vertical portion 36. Only the inclined portion causes the soil to lift as the tool passes edgewise through the soil but this arrangement ensures that towards the surface level of the soil the tool portion 36 is able to pass along a substantially vertical slot rather than an inclined slot.

Such vertical slot is formed by the disc 32 which is located in advance of the tool 30 and is mounted for rotation about a horizontal axis 32' so as to lie in a vertical plane aligned with the plane of the vertical portion 36 of the tool. The disc 32 can penetrate an adjustable amount into the soil but is normally located at a depth substantially at the level of the lowermost part of the tool portion 36.

FIGS. 5 and 6 show the construction of the leg 30 and its associated foot 50 in greater detail. At the leading edge 44 of the leg 30 are releasable wearing elements 40 and 41, the elemeint 40 extending along the leg over the lower end of the upright portion 36, over the bent region 39 and over the upper part of the inclined portion 38. The element 41 extends over the lower part of the inclined portion 38.

The elements 40 and 41 are apertured at 42 to receive fixing bolts whereby the elements are releasably attached to the leg and there is provided a bevelled surface 43 on the upper surfaces of each element 40 and 41 to assist in the lifting action of the leg on the soil as the leg passes through the soil. Above the element 40 the upright portion 36 is similarly bevelled.

The leading edges 40' and 41' of the elements 40 and 41 are aligned with one another and with the bevelled edge of the upper part of the upright portion 36 to inhibit any tendency of plant debris on the soil surface to be caught on the leading edges. In addition it will be seen that the upright portion 36 is of a length that the frame of the implement is located well above ground level G during use. This gives adequate clearance for plant debris, such as maize stems, to pass under the frame during use of the implement. In the implement illustrated the distance between ground level and the frame is approximately equal to the depth of operation of the tool.

The lower end of each leg 30 carries a foot member 50 welded to the lower end of the inclined portion 38 which is arranged to guide and stabilise the movement of the tool through the ground. The member 50 includes an upwardly and rearwardly inclined leading edge 52, formed of a replaceable member, and the leading edge ensures that when the tool enters the ground the tool moves downwardly to the selected depth relative to the ground level G. The assembly also includes side surfaces which at one side 54 is an upright replaceable wearing plate which resists the lateral thrust on the tool due to the inclination of the tool portion 38.

Each of the legs 30 is provided at the rear edge of the lower part of the inclined portion 38 with an adjustable flap or shatter plate 45 which is hinged along one edge about a pivot 45' lying in the plane of the portion 38 so as to be movable between a position aligned with the plane of the portion 38 and a position inclined upwards from the plane of the portion 38. In the latter position the plate 45 increases the lifting action of the leg on the soil.

As an alternative to the legs 30 each having a vertical portion 36, an intermediate curved region 39 and an inclined portion, the intermediate region may be rectilinear and joined to the portions 36 and 38 through bends. In this case the intermediate region will be located at ground level and will be at an angle of about 10°-30° to the vertical and the associated disc will be similarly inclined to the vertical.

Referring now to FIGS. 3 and 4 in this case each tool 30 has an upright or vertical portion 36B at its upper end by which the tool is attached to the body 37. The portion 36B is integral and contiguous with a lower arcuate portion 38B constituting a portion inclined to the vertical at an angle which changes along the length of the portion. Towards its upper end and over an intermediate region 39B which penetrates the ground surface the inclination of the portion 38B to the vertical is zero or small, but the inclination progressively increases and is at a maximum at its lowermost end.

Thus it will be seen that the tool of FIGS. 3 and 4 passes in a vertical or nearly vertical position through the ground in the region towards the soil surface G and from the drawings it will be seen that the disc 32 associated with each tool 30 is arranged in a vertical or nearly vertical plane and is rotatable about a horizontal axis 32', in a similar manner to the discs of the FIGS. 1 and 2 embodiment, to form a vertical slot in advance of and in alignment with the tool. Instead of an arcuate portion 38B the tool of FIGS. 3 and 4 may be curvilinear, the radius of curvature changing between the upper and lower ends of the portion 38B. Alternatively the portion 38B may be partly curvilinear and partly rectilinear.

An arrangement of three replaceable leading edge members may be provided for the FIGS. 3 and 4 embodiment but in this case each edge member is curved and identical in shape to the other edge members and, therefore interchangeable. This opportunity arises because the working portion 38B of each tool is wholly arcuate in end view.

Referring now to FIGS. 7 and 8 there is shown a tool or leg 30, similar to that of FIGS. 3 and 4, to a larger scale. In FIG. 7 is also shown, schematically, a disc 32 to indicate the preferred position of the disc in relation to the tool for forming a slot for the tool to enter during use.

The changing angle of the tool relative to the vertical is also shown the angle $\alpha^1$ at its upper end being less than angle $\alpha^2$ towards its central region and the maximum angle $\alpha^3$ being at the lowermost end.

In FIGS. 7 and 8 the tool includes a foot member 50 similar to that of FIGS. 5 and 6 including a body 51 welded to the tool 30 and a replaceable leading end member 52. The replaceable side members are omitted from this view.

As an alternative to the rectilinear front and rear edges 44 and 42 shown in full lines the tool may have curvilinear front and rear edges 44' and 42' as viewed in side elevation. In each arrangement the lower part of the leading edge 44 leads the upper part of the working portion of the tool.

There is also seen in FIGS. 7 and 8 replaceable wearing elements 46, in this case three in number, which are located along the leading edge of the working portion of the tool. Each element is the same as the others, that is it has the same curvature and is of the same lengths whereby the portions of the elements may be interchanged. This feature is useful in that the elements 46 at different locations on the legs wear at different rates. Interchanging of the elements gives greater life in these wearing parts. Each element 46 is formed with a bevelled leading edge and is secured by bolts or other removable fixing means.

FIGS. 9 and 10 show another form of tool 30, similar to that of FIGS. 7 and 8, again of generally arcuate form in end elevation but in this case having a foot 50 of which the body portion 51 is integral with the tool. By this means the tool and foot can be formed out of a single piece of steel which is cut to shape in the flat and then bent to conform to the illustrated shape. The portion 51 of the foot is shaped to define a tapering leading end over which is locatable a socketed wearing member 52A provided with an upwardly and rearwardly inclined upper surface.

FIGS. 11 and 12 show a tool of the kind described in relation to FIGS. 1 and 2, that is a tool having a straight inclined portion 38 and an upright portion 36 but in this case the tool and the foot body 51 are formed as one piece in the manner of the tools of FIGS. 9 and 10. The leading and trailing edges 44 and 42 may be rectilinear or curvilinear as at 42' and 44' so that the lower part of the leading edge is in advance of the upper part over the working portion.

What I claim as my invention and desire to secure by Letters Patent of the United States is:

1. A cultivating implement comprising a frame, at least one soil working tool mounted on the frame, and a rotatable disc mounted on the frame and arranged for forming a slot in the soil in advance of the soil working tool, the tool including a blade having an inclined portion which in operation extends downwardly into the soil in a plane substantially parallel to its direction of travel through the soil, said portion passing edgewise through the soil in operation and being inclined at an acute angle to the vertical so as to lift the soil lying above the inclined blade portion, the blade also having an upper, generally upright portion, the inclined portion extending at a greater angle to the vertical than said upper portion, and an intermediate transitional region of the blade between said upper portion and said inclined portion, which intermediate region is located in use below the level of the surface of the ground with which the tool is engaged in use, the blade terminating at the lowermost end of the inclined portion, and the disc being mounted in a substantially upright position for rotation about a substantially horizontal axis so that the upper portion of the blade enters the slot formed by the disc.

2. A cultivating implement according to claim 1 including a foot member having at least a portion thereof formed integrally with the lowermost end of the inclined blade portion.

3. A cultivating implement according to claim 1 wherein the inclined portion of the blade is curvilinear in end elevation having a varying inclination relative to the vertical and said inclination being less towards the upper end of the inclined portion.

4. A cultivating implement according to claim 3 wherein the inclined portion of the blade is arcuate in end elevation.

5. A cultivating implement according to claim 4 wherein the arcuate portion of the blade has, along its forward edge, two or more wearing elements the positions of which are interchangeable.

6. A cultivating implement according to claim 1 wherein the leading edge of the tool is continuous along said upper portion, said intermediate region and said inclined portion to obviate any build up of plant debris along said leading edge.

7. A cultivating implement according to claim 1 wherein the leading and/or trailing edges of the tool are of curvilinear shape in side elevation.

8. A cultivating implement according to claim 1, wherein the upper portion of the blade is so dimensioned and mounted on the frame that, in use, the vertical distance between the frame and the soil level engaged by the blade approximates to the depth below said soil level of the said lowermost end of the blade to provide adequate clearance for the frame to pass over plant debris on said soil surface.

9. A cultivating implement comprising a frame, and at least one soil working tool mounted on the frame, the tool including a blade having an inclined portion which in operation extends downwardly into the soil in a plane substantially parallel to its direction of travel through the soil, said portion passiing edgewise through the soil in operation and being inclined at an acute angle to the vertical so as to lift the soil lying above the inclined blade portion, the blade also having an upper, generally upright portion, the inclined portion extending at a greater angle to the vertical than said upper portion, the inclined portion of the blade being curvilinear in end elevation and the blade terminating at the lowermost end of the inclined portion.

10. A cultivating implement according to claim 9 wherein the inclined portion of the blade is arcuate in end elevation, the uppermost end of the arc lying substantially vertically to define said upper portion.

* * * * *